(12) United States Patent
Mizusaki et al.

(10) Patent No.: US 6,562,097 B1
(45) Date of Patent: May 13, 2003

(54) METAL POWDER FOR ELECTROLYTIC CONDENSER, ELECTROLYTIC CONDENSER ANODE BODY USING THE METAL POWDER, AND AN ELECTROLYTIC CONDENSER

(75) Inventors: Yujiro Mizusaki, Kawanuma-gun (JP); Tomoo Izumi, Kawanuma-gun (JP)

(73) Assignee: Cabot Supermetals K. K., Tokyo (JP)

(*) Notice: Subject to any disclaimer, the term of this patent is extended or adjusted under 35 U.S.C. 154(b) by 0 days.

(21) Appl. No.: 09/985,371

(22) Filed: Nov. 2, 2001

(51) Int. Cl.7 .................................................. B22F 3/24
(52) U.S. Cl. ............................ 75/232; 419/19; 419/29
(58) Field of Search ........................ 419/29, 19; 75/232

(56) References Cited

U.S. PATENT DOCUMENTS 4,663,010 A * 5/1987 Debrodt et al. ............. 204/293
5,019,949 A * 5/1991 Ikeda et al. ................. 361/525

* cited by examiner

Primary Examiner—Daniel J. Jenkins
(74) Attorney, Agent, or Firm—Sughrue Mion, PLLC

(57) ABSTRACT

The present invention allows the obtaining of a condenser having high electrostatic capacitance by optimizing the anodic oxidation treatment voltage and particle size of the metal powder for the condenser during production of an electrolytic condenser anode body, and forming an anodic oxide film of a thickness that is suitable for the particle size of the metal powder. In the present invention, and electrolytic condenser anode body is produced by using the metal powder containing 50 wt % or more of particles, in which the primary particle diameter as determined by image analysis is within the range of 2.7×Vf to 10×Vf (units: nm), when the anodic oxidation treatment voltage during formation of an anodic oxide film on an anode sintered body composed of the metal powder is Vf (units: V).

10 Claims, 4 Drawing Sheets

METAL POWDER FOR ELECTROLYTIC CONDENSER, ELECTROLYTIC CONDENSER ANODE BODY USING THE METAL POWDER, AND AN ELECTROLYTIC CONDENSER

BACKGROUND OF THE INVENTION

1. Field of the Invention

The present invention relates to a metal powder suitable for producing an anode body for an electrolytic condenser, an electrolytic condenser anode body that uses the powder, and an electrolytic condenser.

2. Description of the Related Art

Figure 1:
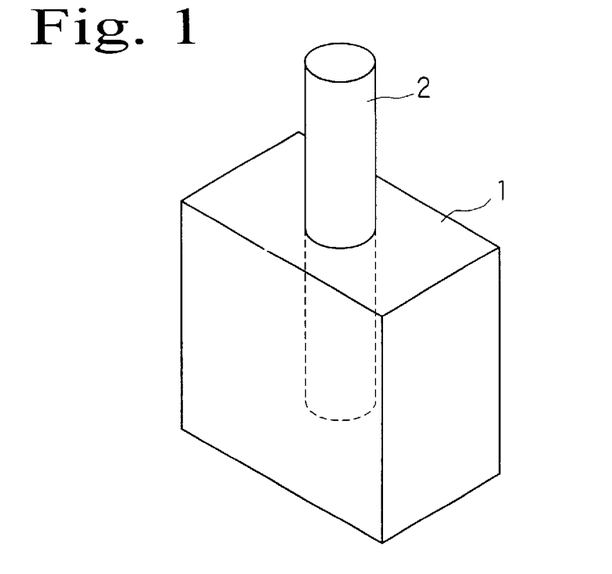
FIG. 1 is a perspective view showing an example of an electrolytic condenser anode body.

FIG. 1 is a perspective view showing an example of an electrolytic condenser anode body. Reference symbol 1 in the drawing is an anode sintered body, and an anodic oxide film is formed thereon. Reference symbol 2 is a lead wire, and the lead wire 2 is partly embedded in the anode sintered body 1.

In producing the electrolytic condenser anode body, a metal powder of tantalum or niobium, etc. and the lead wore 2 are first placed in a mold and pressure molded followed by sintering. As a result, the metal powder is pressed and sintered resulting in the formation of porous anode sintered body 1, and the anode sintered body 1 and lead wore 2 are integrated into a single unit. An anodic oxidation treatment is then performed on anode sintered body 1 to form an anodic oxide film that results in the obtaining of an electrolytic condenser anode body.

An electrolytic condenser is obtained by forming a solid electrolyte layer, for example, manganese dioxide or lead oxide, a graphite layer and a silver paste layer on the anode sintered body 1 of the anode body which was obtained in the manner as described above, and covering them by a plastic casing after connecting a cathode terminal and anode terminal.

The anodic oxidation treatment for forming the anodic oxide film on the anode sintered body 1 is carried out by immersing the anode sintered body 1 in an anodic oxidation treatment solution of, for example, $H_3PO_4$, and applying a voltage. In the present specification, the voltage applied at this time is referred to as the anodic oxidation treatment voltage (or simply as the treatment voltage). During the anodic oxidation treatment, an oxide that results in the formation of an oxide film is formed on the portion that contacting with the anodic oxidation treatment solution, of the metal powder surface that composes the porous anode sintered body 1.

For example, a tantalum powder that is used for the electrolytic condenser is obtained by reducing potassium tantalate fluoride with sodium, heat treating the resulting primary particles to aggregate the particles followed by crushing and sizing to a suitable particle size range.

Figure 2:
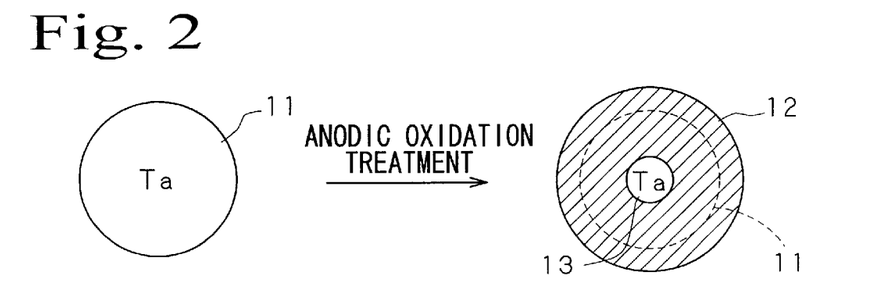
FIG. 2 is an explanatory drawing of anodic oxidation treatment of tantalum powder concerning the present invention.

During the anodic oxidation treatment, as schematically shown in FIG. 2. for example, an oxide film 12 is formed by the formation of oxide ($Ta_2O_5$) due to consumption of the surface portion of tantalum powder 11. The higher the anodic oxidation treatment voltage, the greater the thickness of the oxide film 12.

In a tantalum electrolytic condenser, the interface between the oxide film 12 and the portion inside that is not oxidized (also referred to as metal tantalum) 13 contributes to charge accumulation. Thus, when considering, for example, a single tantalum powder 11, when the entire tantalum powder 11 becomes an oxide due to anodic oxidation treatment, and the portion of the metal tantalum 13 in the center is no longer present, a condenser function is not demonstrated by that tantalum powder 11.

However, increasing the total surface area of the metal powder in the anode sintered body 1 is effective for enhancing the capacitance of the condenser, and in order to accomplish this, powder having a small particle size and large specific surface area has been preferentially used for the tantalum powder 11 for the condenser. In addition, condensers have become increasingly small in recent years in accommodation of the reduced size and more sophisticated functions of electronic equipment, and in response to this, hyperfine powder has come to be used for the tantalum powder 11 for the condenser.

When hyperfine tantalum powder 11 is used, thickness of the anodic oxide film 12 approaches the particle radius of the tantalum powder 11. Since the ability to accumulate charge is lost if all of the tantalum powder 11 is converted to oxide as described above, it is not possible to obtain a condenser having high electrostatic capacitance.

However, since emphasis was primarily placed on reducing the particle size of the tantalum powder, while the relationship between the tantalum powder particle size and anodic oxidation voltage was viewed with little importance, condensers having high electrostatic capacitance were not always obtained.

For example, use of the tantalum powder having an agglomerated particle size of 250 µm or less and BET specific surface area of 0.42 $m^2/g$ is disclosed in Japanese Unexamined Patent Application, First Publication No. 4-218608. The anodic oxidation treatment voltage here is 70 V.

In addition, in Japanese Unexamined Patent Application, First Publication No. 4-136102, the tantalum powder having a BET specific surface area of 0.2 5 $m^2/g$ (equivalent to 1.4 µm in terms of sphere diameter) is used, and the anodic oxidation treatment voltage is set to 100 V.

Moreover, use of the tantalum powder having a mean particle size of 130 nm and carrying out anodic oxidation treatment at a treatment voltage of 40 to 140 V is disclosed in Japanese Unexamined Patent Application, First Publication No. 8-97095.

On the other hand, from the viewpoint of achieving power saving in compact equipment in an attempt to prolong battery life, it has been proposed to lower the anodic oxidation treatment voltage, and recently, low anodic oxidation treatment voltage on the order of 5 V has come to be used.

In consideration of the above circumstances, the object of the present invention is to optimize the relationship between the anodic oxidation treatment voltage and particle size of the metal powder for the electrolytic condenser so as to form an anodic oxide film of a suitable thickness with respect to the particle size of the metal powder and obtain a condenser having high electrostatic capacitance.

SUMMARY OF THE INVENTION

In order to achieve the above object, the present invention provides a metal powder for an electrolytic condenser which is used to produce an electrolytic condenser anode body wherein, when the anodic oxidation treatment voltage when forming an anodic oxide film on an anode sintered body composed of the metal powder is Vf (units: V), particles in which primary particle diameter as determined by image analysis is within the range of 2.7×Vf to 10×Vf (units: nm) are contained at 50 wt % or more.

The electrolytic condenser anode body of the present invention comprises pressure molding the metal powder of the present invention with a lead member followed by sintering and forming an anodic oxide film on the resulting anode sintered body.

The electrolytic condenser of the present invention is equipped with the electrolytic condenser anode body of the present invention as the anode.

A production method of the electrolytic condenser anode body of the present invention comprises presetting the anodic oxidation treatment voltage to Vf (units: V), and pressure molding the metal powder for the electrolytic condenser containing 50 wt % or more of particles, in which the primary particle diameter as determined by image analysis is within the range of 2.7×Vf to 10×Vf (units: nm), with a lead member, followed by obtaining a sintered body by sintering and performing anodic oxidation treatment using the anodic oxidation treatment voltage Vf on the anode sintered body to form an anodic oxide film. The above anodic oxidation treatment voltage Vf can be preferably set within the range of 5 to 250 V.

DESCRIPTION OF THE PREFERRED EMBODIMENTS

The following provides a detailed explanation of the present invention.

The thickness of the oxide film 12 that is formed with respect to the anodic oxidation treatment voltage of 1 V during the anodic oxidation treatment of the tantalum powder 11 is about 2 nm, and tantalum of a thickness of about 1 nm is consumed on the surface of the tantalum powder 11 at this time. Based on this, the inventors of the present invention thought that in order to leave the core of the metal tantalum 13 in the center of the tantalum powder 11 that composes the anode sintered body 1 when the anodic oxidation treatment voltage is set to a certain value, it is necessary to use the tantalum powder 11 in which the particle size is of a certain value or more, and as a result of earnest research, led to completion of the present invention.

In the present invention, the particle size of the metal powder for the electrolytic condenser is expressed as the primary particle diameter (also referred to as a particle size) determined by image analysis. Tantalum powder, niobium powder or a mixture thereof is preferably used for the metal powder.

Figure 3:
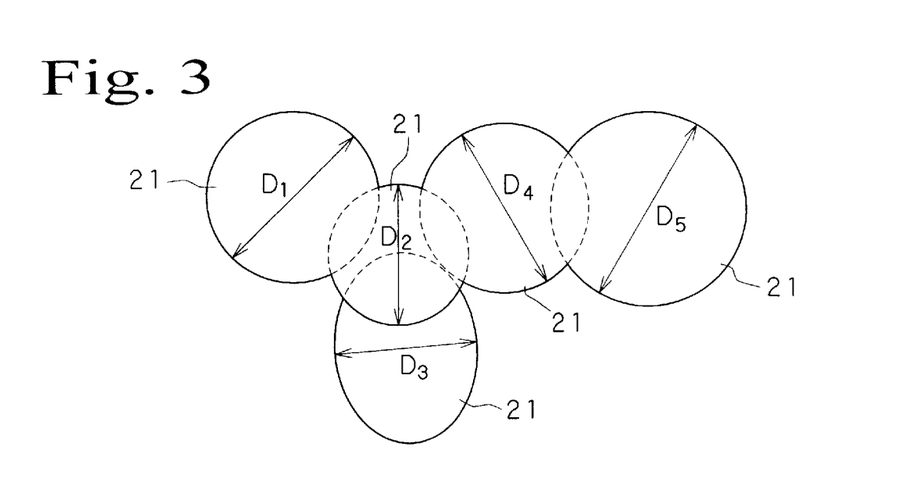
FIG. 3 is an explanatory drawing of the measurement method of primary particle diameter of the metal powder concerning the present invention.

For example, although tantalum powder obtained by reducing potassium tantalate fluoride with sodium, heat treating the resulting primary particles to aggregate the particles followed by crushing and sizing to a suitable particle size range are used for the tantalum powder for the electrolytic condenser, tantalum powder which has undergone such treatment comprises an aggregate in which hyperfine primary particles 21 are linked in the manner of coral as shown in FIG. 3. In the present invention, diameter D1, D2. D3 and D4 of each primary particle 21 is determined by image analysis using an electron microscope for these aggregates. This method consists of treating the aggregates as collections of spherical particles, dividing the aggregates into individual particles on electron micrographs, and calculating the diameter of those particles by treating each particle as a sphere.

Since the distribution of the particle size obtained by image analysis described above is a numerical distribution, this is used in the present invention by converting to a weight distribution in the manner described below.

First, the particles are divided into divisions of 10 or more according to the particle size in order that the particle size of the upper limit (or lower limit) of each division at this time shows a geometrical progression. Next, the product of the volume of the sphere having the mean value of the particle size range in each division as its diameter, and the number of particles contained in that division is determined. The value of this product is considered to be the total volume of the particles contained in that division, and the volume distribution is obtained when the proportion (%) of total particle volume is determined for each division by taking the total volume of all particles being measured to be 100%. Since the volume and weight of the tantalum powder particles are proportional, this volume distribution can be used as the weight distribution.

When determining the weight distribution of the particle size, since the error caused by the field of view of the electron microscope becomes larger for portions of hyperfine particles and portions of large particle size of the measured particle size, it is preferable to exclude these portions. More specifically, it is preferable to determine weight distribution by excluding measured values of about 10% of the particles that contain the minimum value of measured values as well as about 1% of the particles that contain the maximum value in the numerical distribution of the particle size obtained by image analysis.

In the present invention, when the anodic oxidation treatment voltage is set to Vf (units: V), the preferable size of the metal powder is that in which the primary particle diameter determined by the above image analysis is within the range of 2.7×Vf to 10×Vf.

When forming an anodic oxide film on the anode sintered body formed by sintering after press molding the metal powder, if the particle size of the metal powder is too small relative to the anodic oxidation treatment voltage Vf, all of the powder particles end up being converted to oxide which prevents the condenser from demonstrating the ability to accumulate electrical charge, thereby making this undesirable. On the other hand, in order to enhance the capacitance of the condenser, it is preferable that the surface area of all the metal powder in the anode sintered body be large, and in order to accomplish this, the particle size of the metal powder is preferably small.

In addition, although it is preferable that all of the metal powder used is of a size that falls within the above range, if the content of particles of a size within this range is made to be 50 wt % or more, a preferable effect is obtained for increasing the electrostatic capacitance of the condenser.

The following provides an explanation of the reasons for limiting these values.

EXPERIMENT EXAMPLE 1

Figure 4:
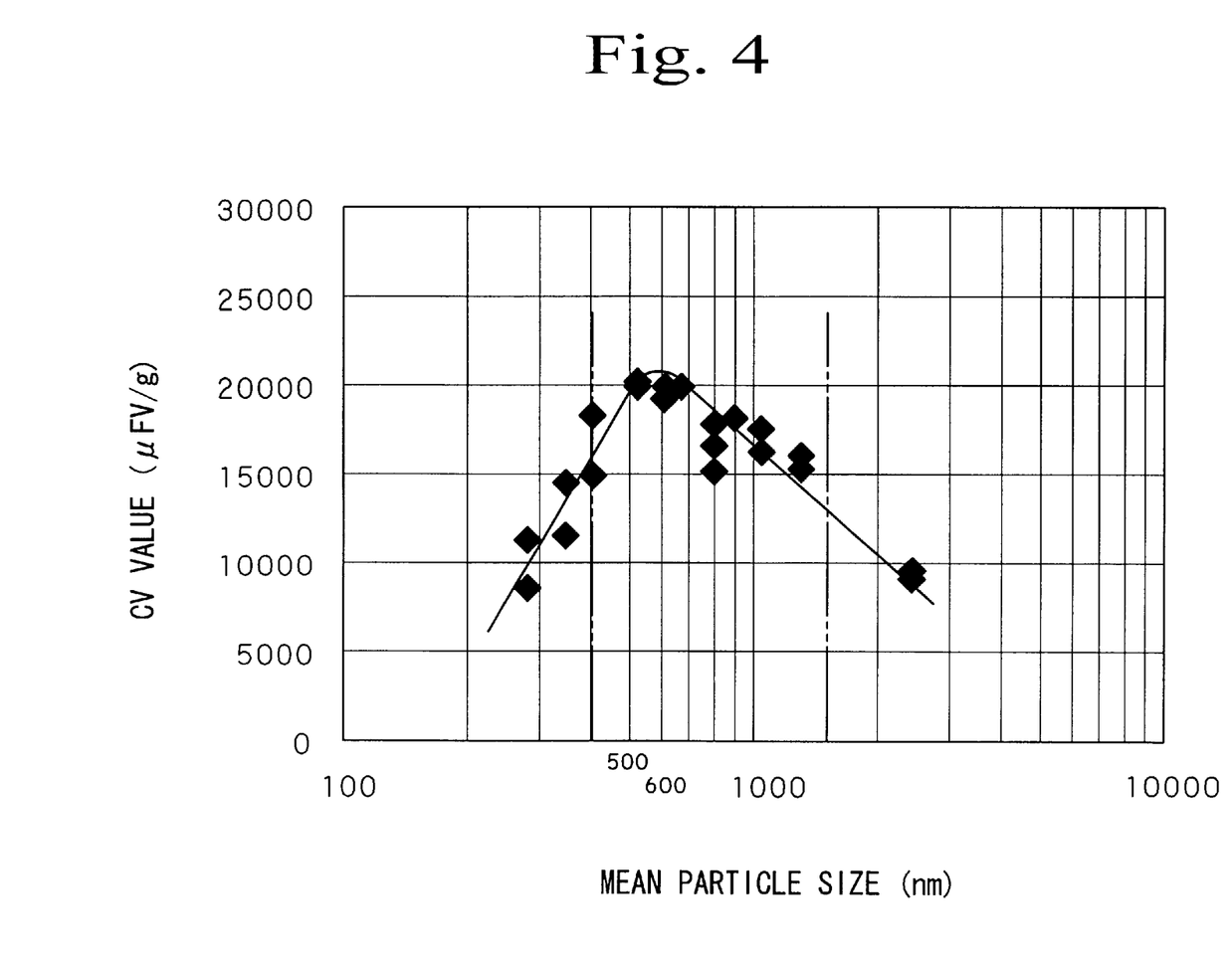
FIG. 4 is a graph showing the relationship between metal powder mean particle size and CV value in an experiment example concerning the present invention.

FIG. 4 is a graph showing the relationship between mean particle size as determined by image analysis and specific electrostatic capacitance (to be referred to as the CV value) of an anode body produced using tantalum powders having various particle size distributions for each of these tantalum powders. The anodic oxidation treatment voltage when the anode body is obtained by forming an anodic oxide film on an anode sintered body comprised of tantalum powder was set at 150 V.

Furthermore, the mean particle size of the tantalum powder in the following experiment example was taken to be the mean value of the particle size range of the division in which the value resulting from sequentially accumulating the proportions of each division reaches 50% with respect to the weight distribution of the primary particle diameter as determined by the image analysis.

According to the results of FIG. 4, CV value was found to reach a peak between a mean particle size of 500–600 nm.

In addition, based on this graph, it was found that the CV value reaches a value (the value at 15000 $\mu$FV/g) equal to or greater than ¾ its peak value (the value at 20000 $\mu$FV/g) when the mean particle size is within the range of 400–1500 nm. Since the anodic oxidation treatment voltage in this experiment example is 150 V, the range of mean particle size at which CV value reaches ¾ or more of its peak value can be expressed as 2.7×Vf to 10×Vf (nm) when the value of the treatment voltage is taken to be Vf.

Here, the reason for using the value of ¾ the peak value for the borderline of CV values is to hold the distribution width to half or less the difference in CV values since the unit for upgrading condensers is 50% the difference in CV values.

EXPERIMENT EXAMPLE 2

Table 1 below respectively shows the particle size distribution (cumulative) and CV values of the anode bodies produced using four types of tantalum powders having the same mean particle size but different particle size distributions (samples A, B, C and D). The anodic oxidation treatment voltage was set to 150 V in all cases. In addition, FIG. 5 graphically represents the particle size distributions of the above samples A through D.

TABLE 1

| | Accumulation (wt %) | | | |
|---|---|---|---|---|
| | A | B | C | D |
| Particle Size (nm) | | | | |
| Up to 50 | 0 | 0 | 0 | 4 |
| Up to 80 | 0 | 0 | 4 | 9 |

TABLE 1-continued

| | Accumulation (wt %) | | | |
|---|---|---|---|---|
| | A | B | C | D |
| Up to 120 | 0 | 4 | 10 | 15 |
| Up to 180 | 5 | 11 | 16 | 21 |
| Up to 270 | 13 | 20 | 25 | 30 |
| Up to 410 | 30 | 36 | 40 | 40 |
| Up to 610 | 50 | 50 | 50 | 50 |
| Up to 910 | 72 | 66 | 62 | 59 |
| Up to 1370 | 94 | 84 | 77 | 68 |
| (Up to 1500) | (97) | (86) | (80) | (70) |
| | 100 | 97 | 89 | 78 |
| Up to 2050 | 100 | 100 | 98 | 88 |
| Up to 3080 | 100 | 100 | 100 | 94 |
| Up to 4610 | 100 | 100 | 100 | 98 |
| Up to 6920 | | | | |
| CV value ($\mu$FV/g) | 20450 | 20250 | 18700 | 17200 |
| Ratio of 2.7 × Vf to 10 × Vf (wt %) | 67 | 50 | 40 | 30 |

Based on the results shown in the above table, the mean particle sizes of samples A through D are all 515 nm, and according to the results of the above Experiment Example 1, although this is within the range for which the peak of CV values is obtained when the anodic oxidation treatment voltage is 150 V, variation is observed in the resulting CV values.

Figure 5:
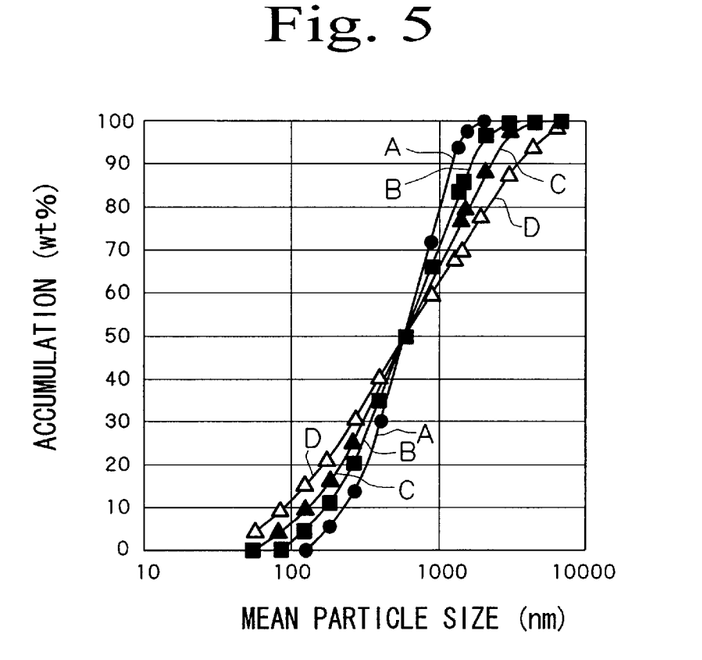
FIG. 5 is a graph showing the particle size distribution of metal powder in an experiment example concerning the present invention.

In addition, in consideration of the graph of FIG. 5, the CV values are higher, the narrower the span between maximum particle size and minimum particle size in the particle size distribution.

Figure 6:
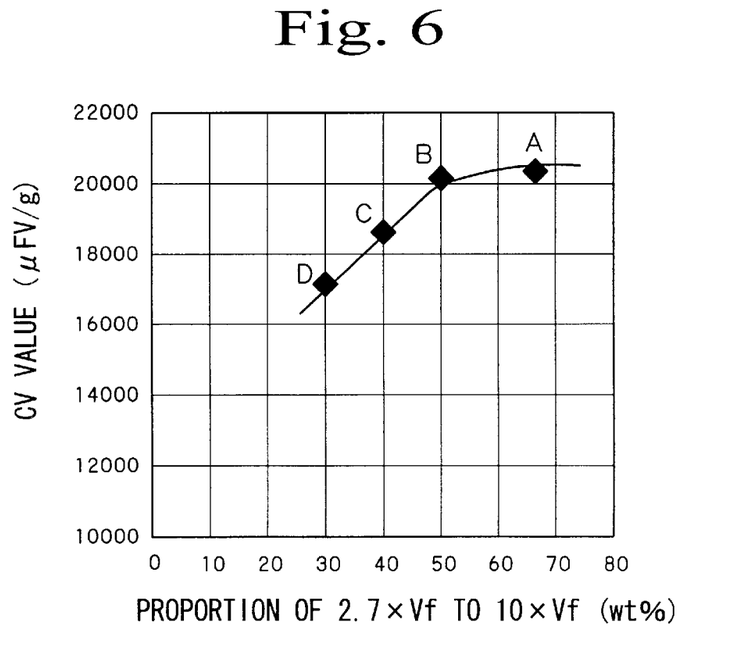
FIG. 6 is a graph showing the relationship between the content of particles of metal powder having a particle size in the optimum range and CV value in an experiment example concerning the present invention.

Furthermore, when the content (wt %) of particles for which the primary particle diameter was within the range of 2.7×150 (=405 nm) to 10×150 (=1500 nm) was investigated for the tantalum powders of samples A through D, the contents were 67 wt % for sample A, 50 wt % for sample B, 40 wt % for sample C and 30 wt % for sample D. The relationship between the values of these contents and the CV values for the respective samples is shown in FIG. 6. According to the results of this figure, it can be seen that, as the content of particles for which the primary particle diameter is within the range of 2.7×Vf to 10×Vf (nm) increases, the CV value of the condenser improves. When the content reaches 50 wt % or more, the CV value does not increase very much, and is considered to have essentially reached its upper limit.

EXPERIMENT EXAMPLE 3

Figure 7:
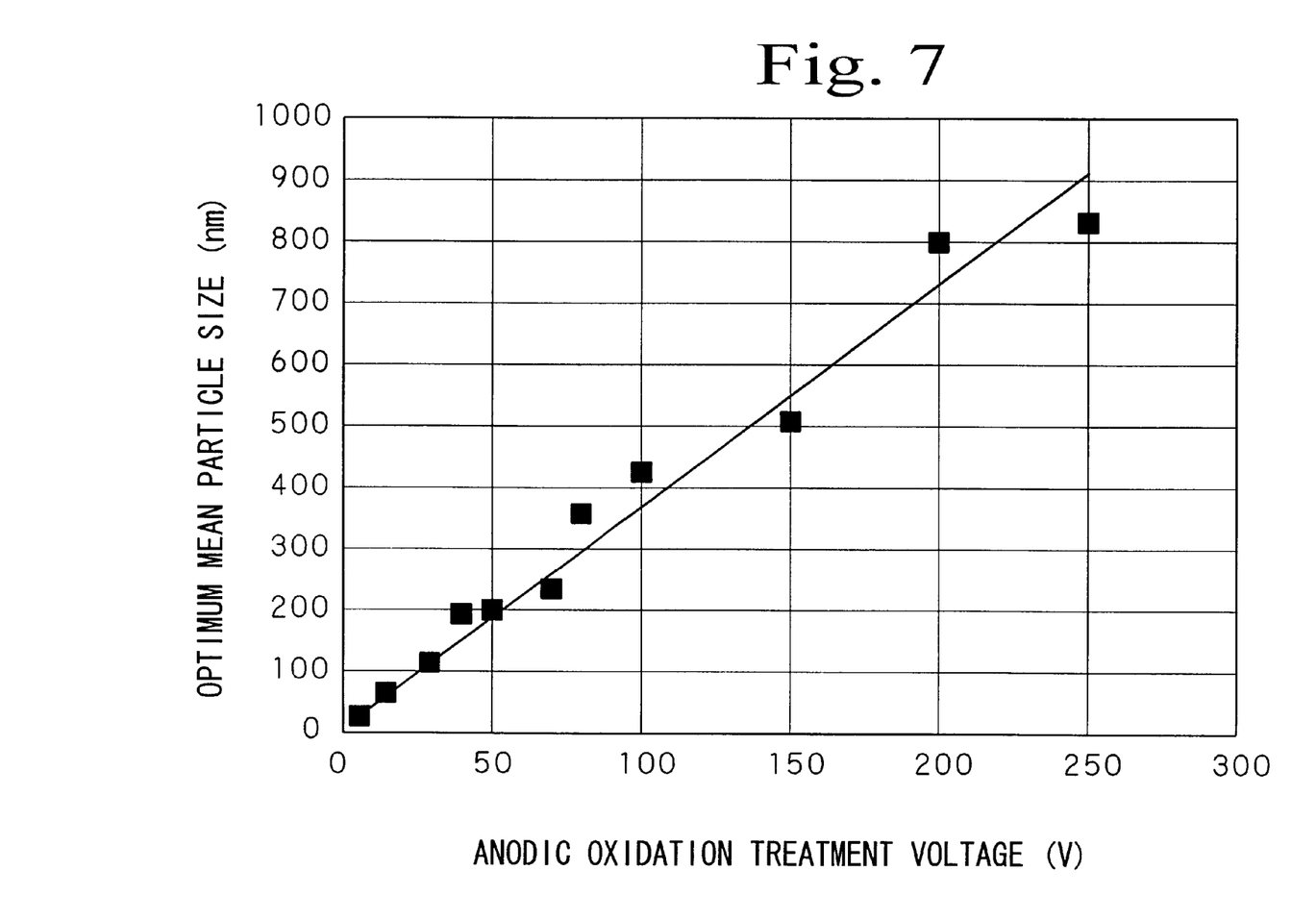
FIG. 7 is a graph showing the relationship between anodic oxidation treatment voltage and optimum mean particle size in an experiment example concerning the present invention.

The relationship between mean particle size and CV value was investigated in the same manner as the above Experiment Example 1 with the exception of varying the anodic oxidation treatment voltage within the range of 5 to 250 V. The relationship between the anodic oxidation treatment voltage and optimum mean particle size at which the peak CV value is obtained when that treatment voltage is used is shown in FIG. 7.

According to the results of this graph, it can be seen that there is a first order proportional relationship between the optimum mean particle size and anodic oxidation treatment voltage within the range of an anodic oxidation treatment voltage of 5 to 250 V. Thus, the mathematical expression and so forth relating to the treatment voltage and particle size obtained in the above Experiment Examples 1 and 2 in which the treatment voltage is 150 V is recognized as being applicable to an anodic oxidation treatment voltage within the range of 5 to 250 V.

Namely, a condenser having high electrostatic capacitance can be obtained by using the tantalum powder containing 50 wt % or more of particles for which the primary particle diameter is within the range of 2.7×Vf to 10×Vf (nm) with respect to the treatment voltage Vf (V) within the anodic oxidation treatment voltage Vf range of 5 to 250 V.

The electrolytic condenser anode body of the present invention is formed into the shape shown, for example, in FIG. 1. The electrolytic condenser anode body of this example is composed of the anode sintered body 1 and the lead wire 2. The anode sintered body 1 is formed using the metal-powder in which particle size distribution satisfies the above conditions, and an anodic oxide film is formed by the anodic oxidation treatment using the preset anodic oxidation treatment voltage Vf.

Furthermore, in the example of FIG. 1, although the lead wore 2 is used for a lead member, there are no particular restrictions on the shape of the lead member, and this may also be in the form of a lead frame. In addition, the shape of the anode sintered body 1 can be changed arbitrarily.

In producing the electrolytic condenser anode body of the present invention, at first, the anodic oxidation treatment voltage Vf is set in advance, and the metal powder is prepared such that the content of particles for which the primary particle diameter is within the range of 2.7×Vf to 10×Vf (nm) based on this Vf value is 50 wt % or more.

In addition, the value of the anodic oxidation treatment voltage Vf is suitably selected by multiplying a fixed safety factor by the voltage used.

Next, the prepared metal powder is filled into a die with the lead wore 2 and pressure molding is carried out. The resulting compact is then sintered to obtain the anode sintered body 1 in which the lead wore 2 is integrated into a single unit with it.

Continuing, an electrolytic condenser anode body is obtained by performing anodic oxidation treatment using treatment voltage Vf on the resulting anode sintered body 1.

A manganese dioxide, iron oxide or other solid electrolyte layer, graphite layer and silver paste layer are sequentially formed by known methods on the anode body resulting from the anodic oxidation treatment, and together with connecting a cathode terminal to the silver paste layer, an anode terminal is connected to the lead wore 2 followed by coating the entire assembly with plastic for use as an electrolytic condenser. The anode body composes the anode of this electrolytic condenser.

According to the present invention, the metal powder for the electrolytic condenser can be provided that has an optimum particle size relative to the value of anodic oxidation treatment voltage Vf. Thus, when the anode body is produced using this metal powder, the oxide film can be effectively formed on the surface while leaving the metal core in the metal powder in the anodic oxidation treatment, and therefore, when producing the electrolytic condenser anode body, the anodic oxide film is formed that has a thickness which is preferable for obtaining the condenser having high electrostatic capacitance. In addition, the electrostatic capacitance of the electrolytic condenser can be improved by making the particle size of the metal powder as small as possible relative to the value of the anodic oxidation treatment voltage.

In an electrolytic condenser anode body obtained using the electrolytic condenser metal powder of the present invention, since the thickness of the anodic oxide film is optimized and charge accumulation ability due to the metal powder is demonstrated efficiently, superior electrical characteristics are obtained. In addition, in an electrolytic condenser provided with this anode body for the anode, high electrostatic capacitance is achieved, which is also advantageous in terms of reducing the size of the electrolytic condenser.

According to the production method of the electrolytic condenser anode body of the present invention, by using the metal powder that has been prepared so that particle size distribution is optimum with respect to the treatment voltage during the anodic oxidation treatment, since the anodic oxide film is formed of a suitable thickness during anodic oxidation treatment, the high-quality anode body having superior electrical characteristics can be produced with good yield.

In addition, in the present invention, since the anodic oxidation treatment voltage can be set over a wide range from 5 to 250 V, the anodic oxidation treatment voltage that can be used for producing an electrolytic condenser can be applied from low values to high values, which is extremely advantageous in terms of offering a high degree of universality.

EXAMPLES

The following describes specific examples of the present invention to clarify its effects.

Example 1

After thermal condensation of Ta powder obtained by reducing $K_2 TaF_7$ with sodium in a vacuum into clumps, the clumps were cooled in a hydrogen atmosphere and crushed to obtain Ta powder. After finely crushing this Ta powder in water with a homogenizer, it was divided into five portions by sedimentation classification. The same treatment was carried out while changing the heating conditions and classification conditions during thermal aggregation to obtain 20 types of Ta powder having various particle size distributions over a particle size range of 100 to 2000 nm. The primary particle diameter of each Ta powder was determined by image analysis followed by measurement of particle size distribution.

Next, the anodic oxidation treatment voltage (Vf) was set to 50 V, and the Ta powder was blended and prepared by setting the particle size distribution so as to contain 50 wt % or more of particles for which the primary particle diameter as determined by image processing analysis in accordance with the calculation formula of 2.7×Vf to 10×Vf (nm) was 135 to 500 nm.

Electron micrographs were taken of the Ta powder following blending and preparation, and particle size distribution was obtained by again measuring primary particle diameter by image analysis. Those results are shown in the following Table 2.

Comparative Examples 1 and 2

For the sake of comparison, particles were subjected to thermal aggregation followed by crushing and classified into sizes of 135 nm or smaller, 135 to 500 nm and 500 nm or larger to prepare two types of Ta powder for which particle size was not adjusted. Particle size distribution for each type of Ta powder was measured by image analysis. Those results are shown in the following Table 2.

Example 2

Using the 20 types of Ta powder prepared in the above Example 1, Ta powder was blended and prepared by setting the anodic oxidation treatment voltage (Vf) to 100 V, and setting the particle size distribution so that 50 wt % or more of particles were contained for which the primary particle diameter as determined by image processing analysis in accordance with the calculation formula 2.7×Vf to 10×Vf (nm) was within the range of 270 to 1000 nm.

Electron micrographs were taken of the Ta powder following blending and preparation, and particle size distribution was obtained by again measuring primary particle diameter by image analysis. Those results are shown in the following Table 3.

Comparative Examples 3 and 4

For the sake of comparison, particles were subjected to thermal aggregation followed by crushing and classified into sizes of 275 or smaller, 270 to 1000 nm and 1000 nm or larger to prepare two types of Ta powder for which particle size was not adjusted. Particle size distribution for each type of Ta powder was measured by image analysis. Those results are shown in the following Table 3.

EVALUATION

Each of the Ta powders obtained in the above Examples 1 and 2 and Comparative Examples 1 through 4 were press molded to a size of 1 mm×1 mm ×1 mm and compact density of 5.0 g/cm³ followed by heat sintering for 20 minutes at 1400° C. in a vacuum to obtain anode sintered bodies. Each anode sintered body was subjected to anodic oxidation treatment at 90° C. in 0.02 wt % phosphate electrolyte to obtain an anode body. The anodic oxidation treatment voltage was set to 50 V in Example 1 and Comparative Examples 1 and 2, and to 100 V in Example 2 and Comparative Examples 3 and 4. The results of measuring the CV values of the resulting anode bodies are also shown in the following Tables 2 and 3.

Furthermore, a cathode composed of a solid electrolyte layer composed of manganese dioxide and iron oxide, a carbon layer and a silver past layer was formed on the anode body, and after respectively connecting the cathode terminal and anode terminal, the entire assembly was sealed in plastic to produce a tantalum electrolytic condenser measuring 3.1 mm long×1.6 mm wide×1.6 mm high.

The electrolytic capacitance and dielectric loss tangent (tan δ) were measured to evaluate the electrical characteristics of the resulting electrolytic condensers. The voltage used was set to 16 V for Example 1 and Comparative Examples 1 and 2, and to 35 V for Example 2 and Comparative Examples 3 and 4. Those results are also shown in the following Tables 2 and 3.

Here, dielectric loss tangent (tan δ) is the value based on equivalent series resistance (ESR), and represents the dielectric loss that causes heat generation of a circuit. Dielectric loss tangent is preferably a small value.

TABLE 2

| Anodic oxidation voltage target optimum particle size | 50 V | | |
|---|---|---|---|
| Primary particle diameter | 135–500 nm | | |
| (wt %) | Example 1 | Comp. Ex. 1 | Comp. Ex. 2 |
| 135 nm or smaller | 22 | 30 | 10 |
| 135 to 500 nm | 52 | 46 | 46 |
| 500 nm or larger | 26 | 24 | 44 |
| CV value($\mu$FV/g) | 63,500 | 51,200 | 55,700 |

TABLE 2-continued

| Anodic oxidation voltage target optimum particle size | 50 V | | |
|---|---|---|---|
| Primary particle diameter | 135–500 nm | | |
| (wt %) | Example 1 | Comp. Ex. 1 | Comp. Ex. 2 |
| Capacitance ($\mu$F) | 7.0 | 5.6 | 6.1 |
| Tanδ (%) | 1.8 | 1.9 | 1.8 |
| Remarks | Optimum particle size | Too fine | Too coarse |

TABLE 3

| Anodic oxidation voltage target optimum particle size | 100 V | | |
|---|---|---|---|
| Primary particle diameter | 135–500 nm | | |
| (wt %) | Example 2 | Comp. Ex. 3 | Comp. Ex. 4 |
| 270 nm or smaller | 18 | 32 | 12 |
| 270 to 1000 nm | 58 | 47 | 44 |
| 1000 nm or larger | 24 | 21 | 44 |
| CV value ($\mu$FV/g) | 30,600 | 24,100 | 25,600 |
| Capacitance ($\mu$F) | 1.7 | 1.3 | 1.4 |
| Tanδ (%) | 2.0 | 2.8 | 2.0 |
| Remarks | Optimum particle size | Too fine | Too coarse |

Based on the results of Tables 2 and 3, the electrolytic condensers obtained in the examples-demonstrated higher electrostatic capacitance and lower tan δ per capacitance than those of the comparative examples.

Although the above has provided an explanation of examples using tantalum powder for the metal powder, the same effect can be expected in the case of using a powder of another valve metal such as niobium powder, or in the case of using a mixture of tantalum powder and niobium powder.

In addition, although a method in which metal powder was crushed and then blended was used to prepare the metal powder having a desired particle size distribution in the above examples, the present invention is not limited to this method, but rather powder can be prepared by adequately controlling particle size in the step in which $K_2TaF_7$ is reduced with Na, and with reference to the procedure described in, for example, Japanese Examined Patent Application, Second Publication No. 20-4641, after performing high-temperature heat treatment on the resulting powder at 1100–1500° C. under reduced pressure, the product is crushed into a powder followed by addition and mixing of magnesium, low-temperature heat treatment at 700–1000° C. and acid washing. By treating in this manner, electrolytic condenser metal powder of the present invention can be produced, and the same effect can be expected.

What is claimed is:

1. An electrolytic condenser anode body formed by the steps comprising:
   pressure molding a metal powder with a lead member followed by sintering and forming an anodic oxide film on the resulting anode sintered body,
   wherein, when an anodic oxidation treatment voltage when forming an anodic oxide film on an anode sintered body composed of said metal powder is Vf (units: V), particles in which a primary particle as determined by image analysis is within the range of 27×Vf to 10×Vf (units: nm) are contained at 50 wt % or more.

2. An electrolytic condenser equipped with the anode body according to claim 1 as an anode.

3. A production method of an electrolytic condenser anode body comprising steps of:

presetting an anodic oxidation treatment voltage to Vf (units: V), and pressure molding a metal powder for a electrolytic condenser containing 50 wt % or more of particles, in which a primary particle diameter as determined by image analysis is within the range of 2.7×Vf to 10×Vf (units: nm), with a lead member, obtaining a anode sintered body by sintering a body obtained by the pressure molding, and performing anodic oxidation treatment using the anodic oxidation treatment voltage Vf on said anode sintered body to form an anodic oxide film.

4. A production method of an electrolytic condenser anode body according to claim 3 wherein said anodic oxidation treatment voltage Vf is set within the range of 5 to 250 V.

5. An electrolytic condenser anode body formed by pressure molding a metal powder without a lead member followed by sintering and forming an anodic oxide film on the resulting anode sintered body, wherein, when an anodic oxidation treatment voltage when forming an anodic oxide film on an anode sintered body composed of said metal powder is Vf (units: V), particles in which a primary particle diameter as determined by image analysis is within the range of 2.7×Vf to 10×Vf (units: nm) are contained at 50 wt % or more.

6. An electrolytic condenser anode body according to claim 1, wherein said metal powder is tantalum powder, niobium powder or a mixture thereof.

7. An electrolytic condenser anode body according to claim 2, wherein said metal powder is tantalum powder, niobium powder, or a mixture thereof.

8. An electrolytic condenser anode body according to claim 5, wherein said metal powder is tantalum powder, niobium powder, or a mixture thereof.

9. A production method of an electrolytic condenser anode body according to claim 3, wherein said metal powder is tantalum powder, niobium powder, or a mixture thereof.

10. A production method of an electrolytic condenser anode body according to claim 4, wherein said metal powder is tantalum powder, niobium powder, or a mixture thereof.

* * * * *

UNITED STATES PATENT AND TRADEMARK OFFICE
CERTIFICATE OF CORRECTION

PATENT NO.    : 6,562,097 B1
DATED         : May 13, 2003
INVENTOR(S)   : Yujiro Mizusaki et al.

It is certified that error appears in the above-identified patent and that said Letters Patent is hereby corrected as shown below:

Column 10,
Line 64, change "27" to -- 2.7 --.

Signed and Sealed this

Second Day of December, 2003

JAMES E. ROGAN
*Director of the United States Patent and Trademark Office*